United States Patent Office 3,654,240
Patented Apr. 4, 1972

3,654,240
CROSSLINKING POLYMERS
Gaetano F. D'Alelio, 2011 E. Cedar St.,
South Bend, Ind. 46617
No Drawing. Continuation-in-part of application Ser. No. 581,688, Sept. 26, 1966. This application Nov. 25, 1968, Ser. No. 778,849
Int. Cl. C08f 3/64, 15/16
U.S. Cl. 260—78.5       18 Claims

ABSTRACT OF THE DISCLOSURE

This invention relates to crosslinkable polymers having a plurality of repeating units of the formula,

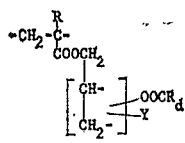

wherein R is H, CH₃, Cl, or CN, $R_dCOO-$ is the radical derived from an unsaturated fatty acid containing 16 to 20 carbon atoms and consisting of 1 to 4 —CH=CH— groups, and Y represents —OH, an acyloxy (—OOCR'), or a urethane group (—OOCNHR''), wherein R' is hydrogen or an aliphatic, aromatic or cycloaliphatic hydrocarbon radical preferably of no more than 20 carbon atoms, and R'' is R' or a monoisocyanate derivative of an R' hydrocarbon radical. These new polymers become insoluble on exposure to air.

---

This invention is a continuation-in-part of copending application Ser. No. 581,688, filed Sept. 26, 1966, now U.S. Pat. No. 3,530,100 which claims polymers containing pendant acrylic groups in which the repeating unit is

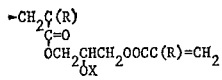

THE DISCLOSURE

This invention relates to crosslinkable polymers. More specifically, it relates to polymers having a plurality of repeating units of the Formula A

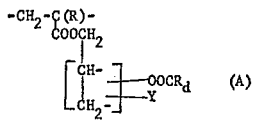

wherein

R is H or a methyl, chloro or cyano radical,
$R_d$ is an unsaturated hydrocarbon containing 16 to 20 carbon atoms and more fully defined hereinafter,
Y is halogen, or OX, wherein X is hydrogen, an acyl radical, including $R_dCO$, or a urethane radical.

In these polymers there at least 2, and preferably at least 5, of said repeating units. In the Formula B,

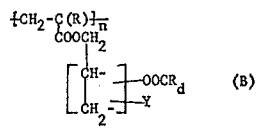

the number of such repeating units is indicated by $n$, which has a value of at least 2, preferably, at least 5.

My copending application, Ser. No. 581,688, now U.S. Pat. No. 3,530,100 claims polymers, (C), having a plurality of repeating units in the linear chain having the formula

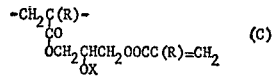

wherein

R is hydrogen, or a methyl, chloro or cyano radical,
X is hydrogen, an acyl radical or a urethane radical.

These polymers (C), are prepared by the reaction of acrylic acids $CH_2=C(R)COOH$ or their anhydrides with linear polymers (D), containing the repeating unit

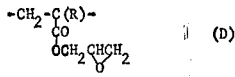

to yield polymers (E), having the repeating unit

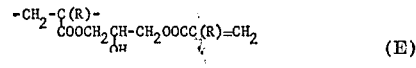

which by postreaction with carboxylic acids, carboxylic chlorides or isocyanates are converted to polymer (C). Also disclosed is the reaction of polymer (D) with oleic, lineolic and linolenic acid to yield polymers which do not contain an acrylic ester group but contain instead an ester group derived from the unsaturated fatty acid, and that these polymers on exposure to oxygen containing gases are converted to the insoluble, infusible state.

The present application deals specifically with polymers having a plurality of repeating units indicated by Formulas A and B given hereinabove. The polymers of this invention, in which X is hydrogen in Formula B, are readily prepared by reacting polymers containing the repeating unit given in Formula D with $R_d$-carbonyl compounds, such as $R_dCOOH$, $R_dCOCl$, or $(R_dCO)_2$, etc. In these $R_d-$ compounds, $R_d$ is an unsaturated hydrocarbon moiety containing no less than 15 and no more than 20 carbon atoms and consisting of a terminal —CH₃ group and at least one and no more than four —CH=CH— groups and the remainder consisting of —CH₂— groups. $R_d$ structures in $R_dCOOH$ acids of this kind are disclosed in my U.S. Pats. 3,203,915, Aug. 31, 1965 and 3,287,298, Nov. 22, 1966. The $R_dCOOH$ acid includes oleic, 9,12-linoleic; 9,11-linoleic; linolenic, arachidonic, licanic, parinaric, eleostearic, palmitoleic, petroselinic, vaccenic, cetolic, etc. acids; the acids from dehydrated and isomerized castor oil; as well as the mixed fatty acids derived from soybean, octicica, tung, linseed, etc. oils, the average compositions of which are also known in U.S. Pat. 3,203,-915. The $R_dCOCl$ compounds are readily derived from $R_dCOOH$ by reaction with $SOCl_2$; anhydrides of $R_dCOOH$ are also readily prepared by the reaction of $R_dCOCl$ with carboxylic acids or their alkali salts.

A free hydroxyl group results from the esterification of polymer (D) by $R_dCOOH$ through the epoxy group, as shown in Formula E, thus

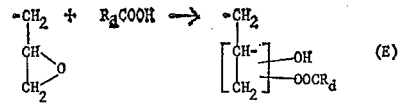

This free hydroxy group can be esterified with more $R_dCOOH$ or $R_dCOCl$, or converted to an ester by reaction with mono- and dicarboxylic acids, anhydrides or chlorides, or by reaction with mono- or diisocyanates.

Reaction of the epoxy group of polymer (D) with $R_dCOCl$ or $R_dCOBr$ yields polymers of Formula B in which Y is halogen, for example,

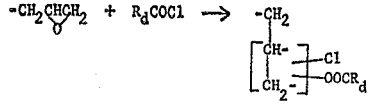

I have now discovered that reaction of the epoxy group of polymer (D) with anhydrides of $R_dCOOH$ yield diesters directly, for example,

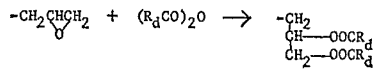

whereas with mixed dianhydrides, mixed diesters are obtained directly, thus

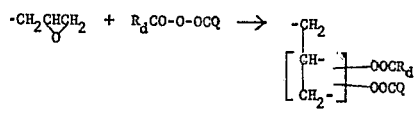

where QCO is the carbonyl residue of a monocarboxylic acid, preferably where Q is completely hydrocarbon and 1–20 carbon atoms and advantageously aliphatic. Q can include $R_d$ as well as other unsaturated and saturated radicals.

The polymers and copolymers of this invention containing the structures shown by Formula B can be described as having pendant $R_dCOO$— ester groups extending from the polymer chain; when these polymers are exposed to oxygen containing gases they become insoluble and infusible. This conversion is accelerated by the addition of metal derivatives known in the coating arts as driers, as for example, naphthenates and maleates of cobalt, nickel, iron, zinc, etc.

The glycidyl polymers and copolymers used in the above reactions to synthesize the polymers of this invention, can be prepared by the vinyl polymerization of the glycidyl acrylate type monomers by procedures well known in the art by means of radical generating initiators such as the peroxy and azo catalysts, ultraviolet light, etc.; of the azo-type catalysts, azobisisobutyronitrile is especially preferred. If peroxy catalysts are used in such polymerizations, they are advantageously of the aliphatic types such as stearyl or lauroyl peroxide, etc. However, benozyl peroxide, tertiary butyl peroxide and other well-known peroxy catalysts such as tertiary butyl peracetate can also be used.

In Formula B above, the terminal portions of the polymer are not shown since it is understood and well-known in macromolecular science, that the fragment of the radical generating catalyst is attached to at least one of the terminal valencies. Then, if termination occurs by coupling of the radical chains both end groups are fragments of the initiator, whereas if termination occurs by disproportionation, an olefinic structure is formed as one terminus of the chain. Both termination mechanisms occur to some extent in radical initiated polymerization. In any case, the nature of the end groups in this polymer is not critical or important, since their concentration is low and the essential features of the polymer reside in the pendant $R_dCOO$— ester group attached to the polymer chain.

When a glycidyl acrylate type homopolymer is desired, this can be obtained by polymerization in a suitable organic non-reactive solvent such as dioxane, tetrahydrofuran, esters such as ethyl acetate, methyl acetate, methyl propionate, ethyl butyrate, etc., the ketones such as methyl ethyl ketone, methyl isobutyl ketone, acetone, etc. In such cases, preferably a 25–65% solution of the monomer in the solvent is used.

For copolymerization in which a substantial or a major part of a comonomer is used, other solvents such as toluene, benzene, xylene, dimethyl acetamide, butyrolactone, etc., can be used.

As the starting polymer (D), for conversion to the polymers of this invention, the glycidyl acrylate-type monomer can be copolymerized with other vinyl monomers such as the acrylic and methacrylic esters such as the methyl, ethyl, propyl, butyl, hexyl, cyclohexyl, dodecyl, etc esters. In addition to, or in lieu of these acrylic type esters used in copolymerization with the glycidyl acrylate to prepare the starting polymer, any other copolymerizable monovinyl or monovinylidene comonomer or mixtures thereof can be used, for example, the vinyl esters, that is vinyl acetate, and the monovinyl esters of saturated and unsaturated, aliphatic, monobasic and polybasic acids, and more specifically the vinyl esters of the following acids: propionic, isobutyric, valeric, caprylic, caproic, stearic, oxalic, malonic, succinic, glutaric, adipic, suberic, azelaic, mesaconic, hexahydrobenzoic, citric, trimesic, etc., as well as the corresponding allyl, methallyl, etc. esters of the aforementioned acids, acrylonitrile, methacrylonitrile, methacrylic acid, hydroxypropyl methacrylate, etc.; itaconic acid esters, such as the methyl, ethyl, butyl esters, the maleic and fumaric acid monoesters, diesters and their amide and nitrile compounds, such as diethyl maleate, maleyl diamide, fumaryl dinitrile, dimethyl fumarate, etc.; ethers, such as methallyl ethyl ether, vinyl ethyl ether, vinyl butyl ether, allyl propyl ether, vinyl butyl ether; cyanuric acid derivatives having one copolymerizable unsaturated group attached directly or indirectly to the triazine ring, such as allyl diethyl cyanurate, vinyl diethyl cyanurate, as well as the vinyl aryl compounds such as styrene, vinyl naphthalene, vinyl toluene, vinyl xylene, vinyl phenol, vinyl ethylbenzene, vinyl dimethylnaphthalene, vinyl diphenyl, etc., vinyl phenyl ether, vinyl benzoate, vinyl naphthoate, vinyl methyl phthalate, allyl ethyl phthalate, allyl propyl phthalate, etc., as well as the partial, soluble or fusible polymerizable polymers of the hereinabove listed monomers, etc.

With azo-type catalysts, the polymerization temperature is advantageously about 75–80° C., the molecular weight depending on the amount of catalyst used. For lower molecular weight polymers, 3% of an azo catalyst such as azobisisobutyronitrile, etc., is used, and for higher molecular weight polymers or copolymers, 1% or 0.1% of the azo catalyst can be used.

The well-known chain transfer agents, such as dodecyl mercaptan, chloroform, carbon tetrachloride, ethylene dibromide, etc., may also be used as an additive in the polymerization to control the molecular weight of the polymer. For light, stable products, the acrylic and methacrylic esters are preferred as comonomers, whereas for economic reasons the styrene type monomers are preferred.

The monobasic acid, that can be used for providing the acyl group to be attached to the free hydroxyl group shown in Formula D are represented by the formula QCOOH in which Q represents H and hydrocarbon radicals containing one to twenty carbon atoms and halogenated, including perhalo, derivatives thereof. The above are illustrated by the following formic, acetic, propionic, butyric, trichloroacetic, oleic, lineoleic, stearic, benzoic, phenylacetic, naphthoic, furoic, methoxyacetic, perfluorobenzoic, hexahydrobenzoic, $R_dCOOH$, etc. The acids or their acyl halides or anhydrides may be used to achieve the esterification. In the mixed anhydride, $R_dCOOOCQ$, Q has the same meaning as defined above for QCOOH.

Typical dibasic acids that can be used, particularly in the anhydride form if available, for esterifying the resultant hydroxy group upon splitting of the oxirane ring, have the formula: HOOC—R''—COOH wherein R'' is a divalent hydrocarbon radical. Typical dibasic acids are oxalic, malonic, succinic, adipic, glutaric, sebacic, 2-methyl succinic, pimelic, 2,3-dimethyl succinic, suberic, hexyl succinic, 1,2-hexahydrophthalic, 1,3-hexahydrophthalic, 1,4-hexahydrophthalic, azelaic, 1,1-cyclobutanedicarboxylic, trans-1,4-cyclohexanedicarboxylic, 3,3-diethyl glutaric, 2,2-dimethyl glutaric, 2,2-dimethyl succinic, 2-keto-glutaric, diglycollic, maleic, fumaric, citraconic, messaconic, acetylene dicarboxylic, aconitic, cyclohexene dicarboxylic, etc., and its homologues, as, for instance, alpha-methyl-itaconic acid, alpha,alpha-dimethyl-itaconic acid, nadic anhydride, phthalic, xylyl dicarboxylic, naphthalene dicarboxylic, alpha-phenyl succinic acid, halogenated derivative thereof such as tetrachlorophthalic, chlorendic anhydride, etc.

Such dibasic acids or their anhydrides are to be used in such proportions that only one carboxylic group will be esterified leaving the other free to impart adhesive or other desirable characteristics.

Typical examples of various isocyanates and diisocyanate compounds that can be reacted with the free hydroxy group as described above to produce various urethane derivatives include but are not restricted to the following: butyl isocyanate, octyl isocyanate, octadecyl isocyanate, phenyl isocyanate, benzyl isocyanate, naphthyl isocyanate, cyclohexyl isocyanate, cyclohexylethyl isocyanate, hexamethylenediisocyanate, tetramethylenediisocyanate, cyclohexylenediisocyanate, 4,4'-dicyclo-hexyl-methanediisocyanate, 2,4-toluylenediisocyanate, 2,6-toluylenediisocyanate, p-phenylenediisocyanate, 4,4'-diphenylmethanediisocyanate, 1,5-naphthylenediisocyanate, dibenzylidenediisocyanate, benzylidenediisocyanate, 4,4'-diphenyldiisocyanate, etc. As with the dibasic acids, sufficient amount of a diisocyanate is to be used so that only one of the isocyanate groups reacts and the other is left free for subsequent reaction.

The polymeric compositions of this invention are particularly useful as coating compositions on all types of substrates, including cellulose in its various forms, such as paper, wood, paper board, wood board, wood pulp, regenerated cellulose, in film or fiber form, laminates of various types including those prepared from fibrous fillers bonded with urea, melamine, epoxy and polyester resins, plaster board, concrete in its various forms such as slabs, blocks and the like. They may also be used as impregnants for porous bodies such as the compositions hereinabove named, as well as for synthetic and natural sponges, etc. Particularly do they find use as bonding agents and adhesives for solid, porous and foamed bodies. They can be used alone or admixed with each other or with other copolymerizable monomers, unsaturated or saturated polymers, in the absence or presence of dyes, pigments, plasticizers. For coating, impregnating or adhesive compositions where the presence of small amounts of solvent in the cured composition is not objectionable they can be mixed with volatile or non-volatile solvents best suited to the particular application.

The polymers of this invention are also useful in the preparation of copolymers with unsaturated alkyd resins. In carrying this portion of the invention into effect, an esterification product of a polyhydric alcohol and an alpha,alpha-unsaturated polycarboxylic acid is first prepared in accordance with techniques now well-known to those skilled in the alkyd resin art.

When it is desired to modify the properties of the crosslinkable polymers of this invention, this can be accomplished by copolymerizing a mixture comprising at least one such polymer with at least one copolymerizable monomer containig at least one unsaturated ethylenic, or acetylenic hydrocarbon radical, more particularly, a $CH_2=C<$ radical, such as vinyl, allyl, methallyl, vinylidene, etc., or with a copolymerizable compound containing a —CH=CH—, or a —CH=C<, or a >C=C< grouping, for example as a vinylidene fluoride, vinylidene cyanide, vinyl propionate, maleic anhydride, or its esters and amides, methyl maleic anhydride, tetrafluoroethylene, etc.

Additional examples of copolymerizable comonomers are monomeric or partially polymerized vinyl esters, such as the acetate, propionate, etc., vinyl ketones, methyl vinyl ketones, olefinic nitriles, such as acrylonitrile, methacrylonitrile, fumaryl nitrile, beta-cyano-ethylacrylate, acrylic and methacrylic esters, for example, methyl acrylate, ethyl acrylate, propyl acrylate, butyl acrylate, ethyl methacrylate, propyl methacrylate, butyl methacrylate, octyl methacrylate, glycol dimethylacrylate, allyl methacrylate, etc.; itaconic esters, for example, dimethyl itaconate, diethyl itaconate, diallyl itaconate; the vinyl ethers, for example, vinyl butyl ether, vinyl isobutyl ether, vinyl cyclohexyl ether, styrene, the o-, m- and p-methyl and chloro styrenes, etc.

In preparing the interpolymerization products of the crosslinkable polymer of this invention and a modifying monomer or polymer, the crosslinkable polymer of this invention can constitute as much as 98 to 99 percent by weight of the whole. In other cases, the modifying monomer or polymer, alone or admixed with comonomers or modifiers can constitute as much as 98 to 99 percent by weight of the whole.

In general, the proportions of the components used in a particular formulation will depend upon the particular properties desired in the interpolymer. For most applications, it is preferred to use 20 to 80 percent of the cross-linkable polymer of this invention and from 80 to 20 percent of the modifying polymer or monomer, since within these ranges interpolymers best adapted for most commercial applications can be produced.

Within these ranges the new interpolymers have a wide range of properties. For example, depending upon the particular crosslinking polymer and any modifying polymer or monomer, the particular proportions thereof, the conditions of polymerization, such as the temperature, pressure, presence or absence of additives, etc., and the extent of polymerization, they can vary from soft flexible bodies to hard rigid masses of varying resistance to solvents.

For coating or impregnating applications where the presence of a small amount of solvent in the cured composition is not objectionable, the mixed starting component can be diluted with volatile or non-volatile solvents or diluents best suited for the particular service application, and then can be polymerized after the application of the solution to the particular article to be coated or impregnated, or impregnated and coated. By suitable selection of the starting material and the conditions of the interpolymerization, interpolymers can be obtained in an insoluble, infusible state practically resistant to the destructive effect of other chemical bodies, such as acid, bases, salts, solvents, swelling agents, and the like.

A few illustrative examples of suitable polymers which may be modified by or mixed with the crosslinkable polymers of this invention are polyvinyl acetate, polyvinyl chloride copolymers, polyethyl acrylate, polymethyl methacrylate cellulose acetate, cellulose butyrate, ethyl cellulose, polyethylene adipate, polyethyene azeeate, polydecamethylene succinate, polydecamethylene sebacate, the polyurethanes, natural and synthetic diene rubbers, etc.

Various methods of practicing the invention are illustrated by the following examples. These examples are intended merely to llustrate the invention and not in any sense to limit the manner in which the invention can be practiced. The parts and percentages recited therein and all through this specification, unless specifically provided otherwise, refer to parts by weight and percentages by weight.

Example I (a) In a suitable apparatus equipped with a stirrer, reflux condenser, an inert gas inlet, heating mantle and thermostatic control, are placed 45 parts of glycidyl acrylate and 55 parts of methyl ethyl ketone. The apparatus is first swept with nitrogen and a nitrogen atmosphere is maintained above the reaction mass. To the above solution is added 0.5 part of azobisisobutyronitrile, and the temperature raised to and maintained at 75–80° C. for a period of two hours, and a clear, viscous solution of homopolymer in quantitative yield is obtained which has the repeating structure,

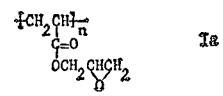

(b) The solution of the product Ia is added slowly with rapid stirring to 250 parts of hexane; a fine precipitate forms which is removed by filtration, and is dried in a vacuum oven at 25° C. for twenty-four hours. There is thereby isolated the solid polymer having an epoxy number corresponding to 97% of structure Ia.

(c) A mixture of 127 parts of solid polymer Ia and 282.5 parts of oleic acid are mixed in a reaction flask and heated under nitrogen at 180° C. for about thirty minutes or until a test sample placed on a glass plate is not inhomogeneous but remains clear when cooled to 30–40° C. This gives the cross-linkable polymer having the repeating structure

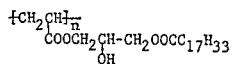

A 35% solution of Ic in toluene, to which is added 0.05% of commercial metallic naphthenate drier, is cast on a glass plate, aluminum sheet and a wood board, respectively. On air drying for four hours, the films become insoluble in toluene, acetone and hexane.

Example II

The procedure of Example Ic is repeated four times, with equivalent quantities of linoleic, linolenic, dehydrated castor oil acid and the mixed fatty acids of tung oil, and the reaction products dissolved in toluene. On air-drying, the respective solutions to which cobalt naphthenate drier had been added, yield films which are insoluble in toluene.

Example III

Example Ia is repeated and to the solution there is added 290 parts of oleylchloride and 1 part of triethylamine, and the mixture refluxed for one hour and there is obtained a solution of the crosslinkable polymer having the repeating structure

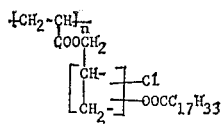

which yields films which air dry in twenty-four hours without driers and in four hours with added drier.

Example IV

Substitution of the oleylchloride of Example III by the acid chlorides of linoleic, linolenic, eleostearic and mixed soyabenic fatty acids respectively yield the corresponding crosslinkable polymers which become insoluble when exposed to air.

Example V

Example I is repeated with mixed xylenes, boiling point 138–144° C., and to the xylene solution is added 324 parts of acetyloleylyl anhydride, $CH_3COO.COC_{17}H_{33}$ and 1 part of triethylamine. The mixture is refluxed for two hours and there is obtained the crosslinkable polymer having the repeating unit,

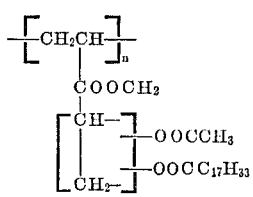

Example VI

The procedure of Examples I to V inclusive is repeated with an equimolar quantity of glycidylmethacrylate instead of glycidylacrylate, and in all cases crosslinkable polymers having the repeating structure,

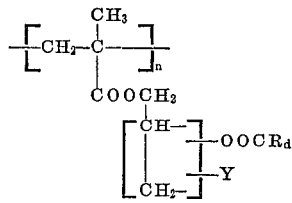

are obtained, which yield insoluble films when exposed to air.

Example VII

The following copolymers are prepared using 120 parts of methylisobutylketone with 100 parts of monomer by refluxing the mixtures for three hours under a nitrogen atmosphere.

|  | Copolymer | | | |
|---|---|---|---|---|
|  | A | B | C | D |
| Methyl methacrylate (parts) | 95 | 90 | 85 | 80 |
| Glycidyl methacrylate (parts) | 5 | 10 | 15 | 20 |
| Azobisisobutyronitrile (parts) | 3 | 3 | 3 | 3 |
| Gardner Holt viscosity | N-O | N | U-¼ | U-V |
| Percent solids | 43.3 | 43.4 | 42.9 | 42.8 |

These copolymers have the repeating structures wherein $n'$ also has a value of at least 2:

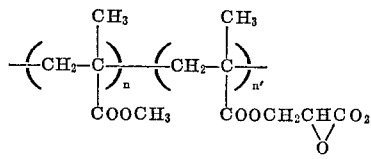

The solid copolymers are isolated from the solution by the procedure of Example Ib.

Example VIII

The procedures of Examples Ic, II, III, IV and V are repeated using an amount of unsaturated fatty acid component corresponding to the equivalent amount of epoxy moieties in the copolymers, and, in all cases, crosslinkable polymers are obtained which become insoluble on air drying.

Example IX

The soluble polymers of Examples Ic, II, VI and VIII containing the free-hydroxyl group in the

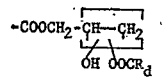

structure, are reacted with various reagents in proportion to the hydroxyl number of each sample:

(a) With acetic anhydride, the resulting polymer has the repeating pendant structure,

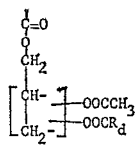

(b) With acrylic or methacrylic anhydride,

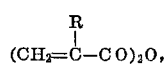

the resulting polymer has the repeating pendant structure,

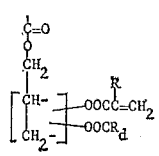

(c) When the reagent is succinic anhydride, the resultant polyer has the repeating pendant structure,

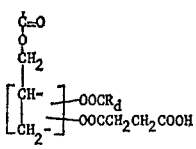

(d) When the reagent is maleic anhydride, the resultant polymer has the repeating pendant structure,

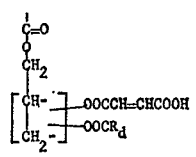

(e) When the reagent is a monoisocyanate, R''NCO, for example, $C_4H_9NCO$, $C_6H_5NCO$, $H_3CC_6H_4NCO$, the resultant polymer has the repeating pendant structure,

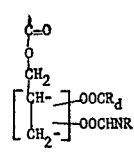

Example X

The procedures of Examples I to IX inclusive are repeated using instead of glycidyl acrylate or glycidyl methacrylate, glycidyl-alpha-chloroacrylate and glycidyl alpha-cyano-acrylate respectively. In each case, the homopolymer or copolymer obtained corresponds to that obtained with the glycidyl acrylates, except that the repeating unit derived from the acrylate has the respective alpha-substituents thereon.

Example XI

The procedure of Example VII is repeated five times using in each case 30 mole percent of glycidyl acrylate and 70 mole percent of vinyl acetate, acrylonitrile, vinyl chloride, dimethylacrylamide and styrene respectively, as comonomers. Similar results are obtained as in Example VII, except that the structure of the repeating unit derived from the commonomer varies according to the structure of the respective comonomers.

Example XII

The procedure of Example II is repeated using 575 parts of oleyl anhydride $(C_{17}H_{33}CO)_2O$ instead of the oleic acid and there is obtained the crosslinkable polymer having the repeating structure

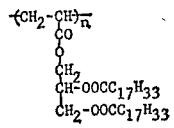

which air dry readily without the aid of dryers.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. A crosslinkable polymer having a plurality of repeating units therein having the formula

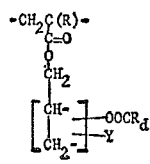

wherein

R is a radical selected from the class consisting of hydrogen, methyl, chloro and cyano; and $R_d$ is an unsaturated hydrocarbon containing no less than 15 and no more than 20 carbon atoms and consisting of a terminal —$CH_3$ group, at least one and no more than four —CH=CH— groups, and the remainder —$CH_2$— groups;

Y is a member selected from the class of halogen and —OX, wherein X is a radical consisting of hydrogen, acyl and urethane, said acyl radical having the formula

wherein R' is selected from the class consisting of $R_d$, saturated aliphatic, aryl and cycloaliphatic hydrocarbon and the hydrocarbon radical having halogen or a carboxyl group attached thereto, and said urethane radical having the formula,

wherein R'' is a radical selected from the class consisting of hydrocarbon and the hydrocarbon radical having an —NCO group attached thereto, there being at least two said repeating units per polymer molecule and there being at least two of said repeating units per each 100 repeating units therein.

2. The polymer of claim 1, in which the proportion of said repeating units in said polymer represents approximately 10–25 molar percent of the total number of repeating units in said polymer.

3. The polymer of claim 1, in which the polymer contains in addition to said repeating units at least 5 molar percent of a repeating unit having the formula

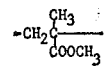

4. The polymer of claim 1, in which the polymer contains in addition to said repeating units at least 5 molar percent of a repeating unit having the formula

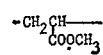

5. The polymer of claim 1, in which the polymer contains in addition to said repeating units at least 5 molar percent of a repeating unit having the formula

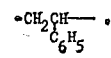

6. The polymer of claim 1 in which Y is OH.
7. The polymer of claim 1 in which Y is —OOCR'.
8. The polymer of claim 1 in which Y is —$OOCR_d$.
9. The polymer of claim 1 in which Y is —$OOCCH_3$.
10. The polymer of claim 1 in which Y is

—OOCHNR''

11. The polymer of claim 6 in which $R_d$ is —$C_{17}H_{33}$.
12. The polymer of claim 7 in which $R_d$ is —$C_{17}H_{33}$.
13. The polymer of claim 8 in which $R_d$ is —$C_{17}H_{33}$.
14. The product of claim 9 in which $R_d$ is —$C_{17}H_{33}$.
15. The product of claim 10 in which $R_d$ is —$C_{17}H_{33}$.
16. The product of claim 1 in which $R_d$ is —$C_{17}H_{31}$.
17. The product of claim 1 in which —$OOCR_d$ comprises a mixture derived from a mixture of $R_dCOOH$ acids.
18. The process of preparing a crosslinkable polymer of claim 1 comprising the step of reacting a starting polymer having a plurality of repeating units therein having the formula

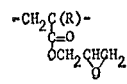

wherein

R is a radical selected from the class consisting of hydrogen, methyl, chloro and cyano;

with an unsatuurated compound selected from the class of $R_dCOOH$, $R_dCOX$ and $R_dCOO-OCQ$, wherein $R_d$ is an unsaturated hydrocarbon containing no less than 15 and no more than 20 carbon atoms and consisting of a terminal —$CH_3$ group and at least one and no more than four —CH=CH— groups and the remainder —$CH_2$— groups;

X is a halogen selected from the class of chlorine and bromine, and

Q is a carbonyl residue of a monocarboxylic acid, said unsaturated compound being used in an amount of at least two molar quantities per polymer molecule, said polymer molecule having at least one said repeating unit per each 100 repeating units therein and being reacted at a temperature in the range of 60–200° C.

until a substantial amount of the polymer of claim 1 has been formed.

References Cited

UNITED STATES PATENTS

| | | | |
|---|---|---|---|
| 2,504,082 | 4/1950 | Neher et al. | 260—89.5 |
| 3,284,385 | 11/1966 | D'Alelio | 260—89.5 |
| 3,330,814 | 7/1967 | Vasta | 260—23 EP |
| 3,366,613 | 1/1968 | Kelley | 260—89.5 |
| 3,448,089 | 6/1969 | Celeste | 260—85.5 ES |
| 3,530,100 | 9/1970 | D'Alelio | 260—85.5 OT |

HARRY WONG JR., Primary Examiner

U.S. Cl. X.R.

117—124, 132, 138.8, 140, 145, 148, 155, 161; 161—247; 204—159.22; 260—17.4, 23.5, 47, 63, 78.4, 85.5, 86.1, 86.3, 86.7, 88.3, 89.5, 874, 885, 887, 889, 901